United States Patent
Kim

(10) Patent No.: US 12,039,541 B2
(45) Date of Patent: *Jul. 16, 2024

(54) SYSTEMS AND METHODS FOR BREAKING UP SELECT REQUESTS TO STREAMLINE PROCESSES AND IMPROVE SCALABILITY

(71) Applicant: COUPANG CORP., Seoul (KR)

(72) Inventor: Hyun Kim, Seoul (KR)

(73) Assignee: Coupang Corporation, Seoul (KR)

( * ) Notice: Subject to any disclaimer, the term of this patent is extended or adjusted under 35 U.S.C. 154(b) by 203 days.

This patent is subject to a terminal disclaimer.

(21) Appl. No.: 17/523,052

(22) Filed: Nov. 10, 2021

(65) Prior Publication Data

US 2022/0222667 A1 Jul. 14, 2022

Related U.S. Application Data

(63) Continuation of application No. 17/148,610, filed on Jan. 14, 2021, now Pat. No. 11,216,821.

(51) Int. Cl.
*G06Q 20/40* (2012.01)
*G06F 9/54* (2006.01)
(Continued)

(52) U.S. Cl.
CPC ........... *G06Q 20/407* (2013.01); *G06F 9/541* (2013.01); *G06F 16/2379* (2019.01); *G06Q 20/085* (2013.01)

(58) Field of Classification Search
None
See application file for complete search history.

(56) References Cited

U.S. PATENT DOCUMENTS

| 5,761,308 A | 6/1998 | Torii et al. |
| 11,004,087 B1 | 5/2021 | Kim et al. |

(Continued)

FOREIGN PATENT DOCUMENTS

| JP | 2007-328779 | 12/2007 |
| KR | 10-2015-0067024 | 6/2015 |

(Continued)

OTHER PUBLICATIONS

International Search Report and Written Opinion mailed Oct. 12, 2021 by the Korean Patent Office in counterpart PCT Application No. PCT/IB2021/050874, 10 pages.

(Continued)

*Primary Examiner* — Charles E Anya
(74) *Attorney, Agent, or Firm* — Finnegan, Henderson, Farabow, Garrett & Dunner LLP

(57) ABSTRACT

A computer-implemented system for processing a return without receiving an item to minimize network load is disclosed. The system may be configured to receive a return application programming interface (API) call from a user device requesting a return of a returned item; validate the return API call against data records of a networked database; determine that the returned item comprises a plurality of individual items; analyze a return code of the return API call to determine whether a subset of the individual items is defective; determine a portion of a price of the returned item corresponding to the subset of the individual items; generate a refund API call to issue the portion of the price of the returned item as a refund; update the data records of the networked database to record the refund; and transmit a notification to the user device regarding an approval of the return API call.

18 Claims, 13 Drawing Sheets

(51) Int. Cl.
*G06F 16/23* (2019.01)
*G06Q 20/08* (2012.01)

(56) References Cited

U.S. PATENT DOCUMENTS

| | | | |
|---|---|---|---|
| 2003/0225625 A1* | 12/2003 | Chew | G06Q 20/209 |
| | | | 705/24 |
| 2008/0235042 A1 | 9/2008 | Boyd et al. | |
| 2009/0048934 A1 | 2/2009 | Haddad et al. | |
| 2010/0131420 A1 | 5/2010 | Williams et al. | |
| 2010/0145754 A1 | 6/2010 | Rahman | |
| 2011/0191212 A1* | 8/2011 | Iburg | G06Q 30/0283 |
| | | | 705/28 |
| 2012/0215615 A1 | 8/2012 | Moredock | |
| 2014/0257927 A1 | 9/2014 | Brock et al. | |
| 2016/0350756 A1 | 12/2016 | Shepard et al. | |
| 2017/0155743 A1 | 6/2017 | Sukhija et al. | |
| 2017/0228412 A1 | 8/2017 | Agarwal et al. | |
| 2018/0114228 A1* | 4/2018 | Singh | G07G 1/0063 |
| 2020/0387863 A1 | 12/2020 | Ruth et al. | |
| 2022/0019968 A1* | 1/2022 | Freeman | G06K 19/06037 |

FOREIGN PATENT DOCUMENTS

| | | |
|---|---|---|
| KR | 10-2020-0129412 | 11/2020 |
| WO | WO 2014/179233 A2 | 11/2014 |

OTHER PUBLICATIONS

Notice of Preliminary Rejection mailed Sep. 15, 2022, by the Korean Patent Office in counterpart Korean Application No. 10-2021-0148297, 11 pages.

* cited by examiner

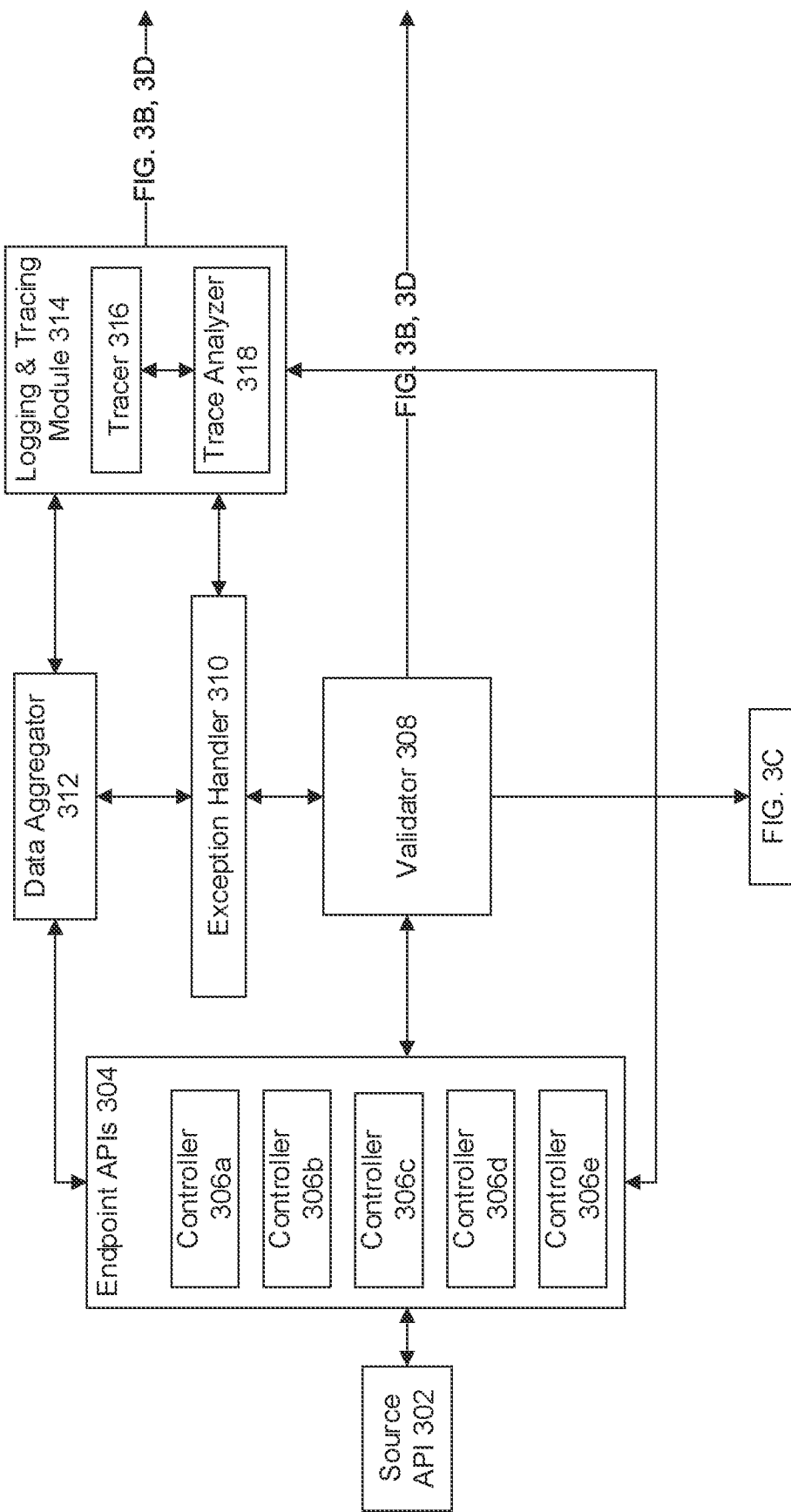

SYSTEMS AND METHODS FOR BREAKING UP SELECT REQUESTS TO STREAMLINE PROCESSES AND IMPROVE SCALABILITY

RELATED APPLICATIONS

This application is a continuation of U.S. patent application Ser. No. 17/148,610 (now allowed) filed on Jan. 14, 2021, which is hereby incorporated by reference in the present application in its entirety.

TECHNICAL FIELD

The present disclosure generally relates to computerized systems and methods for streamlining select processes to improve scalability. In particular, embodiments of the present disclosure relate to inventive and unconventional systems that identify a subset of electronic requests that can benefit from a more streamlined process, thus reducing network load and improving scalability.

BACKGROUND

Advances in computer networking have moved many different processes online, enabling fast, remote processing, and automation. In particular, increasing number of business processes that used to require human intervention are now conducted online to the point where hundreds of thousands or millions of transactions can take place daily within a company's network.

These transactions are typically implemented using Application Programming Interfaces (APIs) that enable communications between different systems, subsystems, and modules. Communications using APIs to process transactions, also known as API calls, are often small in size (e.g., less than a few hundred bytes) and do not exert a significant load on the networks. Advances in network communications that enable faster data transfer also ensure that the networks are capable of supporting large loads.

A problem arises, however, as more systems, subsystems, or modules are added to the network to specialize in certain tasks, and an increasing number of them gets involved to complete a transaction. For example, a simple request to return an item to an online shopping mall may involve API calls among: a system that received the return request; a system that managed the initial order; a system that processed the payment for the order; a system that manages return shipping; a system that receives and restocks the returned item; as well as the subsystems and modules that function in conjunction with the systems. The problem is exacerbated when the networks must support millions of users or transactions per day. Even small API calls around 100 bytes can quickly balloon and hog down a network.

The network load generated by simply applying the same set of API calls involving the same number of systems and subsystems for each new transaction (e.g., order processing) will only increase linearly with the increase in the number of new requests. Meaning an exponential increase in users and the transactions that they generate will lead to an exponential increase in network load, which can quickly strain a network. Therefore, the set of API calls must be optimized in order to reduce the network load and improve scalability for meeting increases in demand.

SUMMARY

One aspect of the present disclosure is directed to a computer-implemented system for processing a partial refund without receiving an item to minimize network load. The system may comprise: at least one non-transitory computer-readable medium configured to store instructions; and at least one processor configured to execute the instructions to perform operations. The operations may comprise: receiving a return application programming interface (API) call from a user device requesting a return of a returned item; validating the return API call against data records of a networked database; determining that the returned item comprises a plurality of individual items; analyzing a return code of the return API call to determine whether a subset of the individual items is defective; determining a portion of a price of the returned item corresponding to the subset of the individual items; generating a refund API call to issue the portion of the price of the returned item as a refund; updating the data records of the networked database to record the refund; and transmitting a notification to the user device regarding an approval of the return API call.

Another aspect of the present disclosure is directed to a method for a computer-implemented method for processing a partial refund without receiving an item to minimize network load. The method may comprise: receiving a return application programming interface (API) call from a user device requesting a return of a returned item; validating the return API call against data records of a networked database; determining that the returned item comprises a plurality of individual items; analyzing a return code of the return API call to determine whether a subset of the individual items is defective; determining a portion of a price of the returned item corresponding to the subset of the individual items; generating a refund API call to issue the portion of the price of the returned item as a refund; updating the data records of the networked database to record the refund; and transmitting a notification to the user device regarding an approval of the return API call.

Yet another aspect of the present disclosure is directed to a computer-implemented system for processing a partial refund without receiving an item to minimize network load. The system may comprise: at least one non-transitory computer-readable medium configured to store instructions; and at least one processor configured to execute the instructions to perform operations. The operations may comprise: receiving a return application programming interface (API) call from a user device requesting to return a portion of an item; parsing the return API call to determine a ratio between the portion of the item and the item as a whole; comparing a category identifier associated with the portion of the item against a reason code included in the return API call; if the category identifier is acceptable with respect to the reason code: transmitting a refund API call to a payment management system, updating the data records of the networked database to record a refund based on the ratio, and transmitting a notification to the user device regarding an approval of the return API call; and if the category identifier is not acceptable with respect to the reason code: generating a retrieval API call requesting a retrieval of the portion of the item, capturing an item identifier of the portion of the item upon the retrieval of the portion of the item, updating the data records of the networked database to record the retrieval of the portion of the item, transmitting the refund API call to a payment management system, updating the data records of the networked database to record the refund based on the ratio, and transmitting the notification to the user device regarding an approval of the return API call.

Other systems, methods, and computer-readable media are also discussed herein.

BRIEF DESCRIPTION OF THE DRAWINGS

FIG. 3A illustrates an exemplary pictographic representation of an intake sub-system 300, consistent with the disclosed embodiments.

DETAILED DESCRIPTION

Figure 1A:
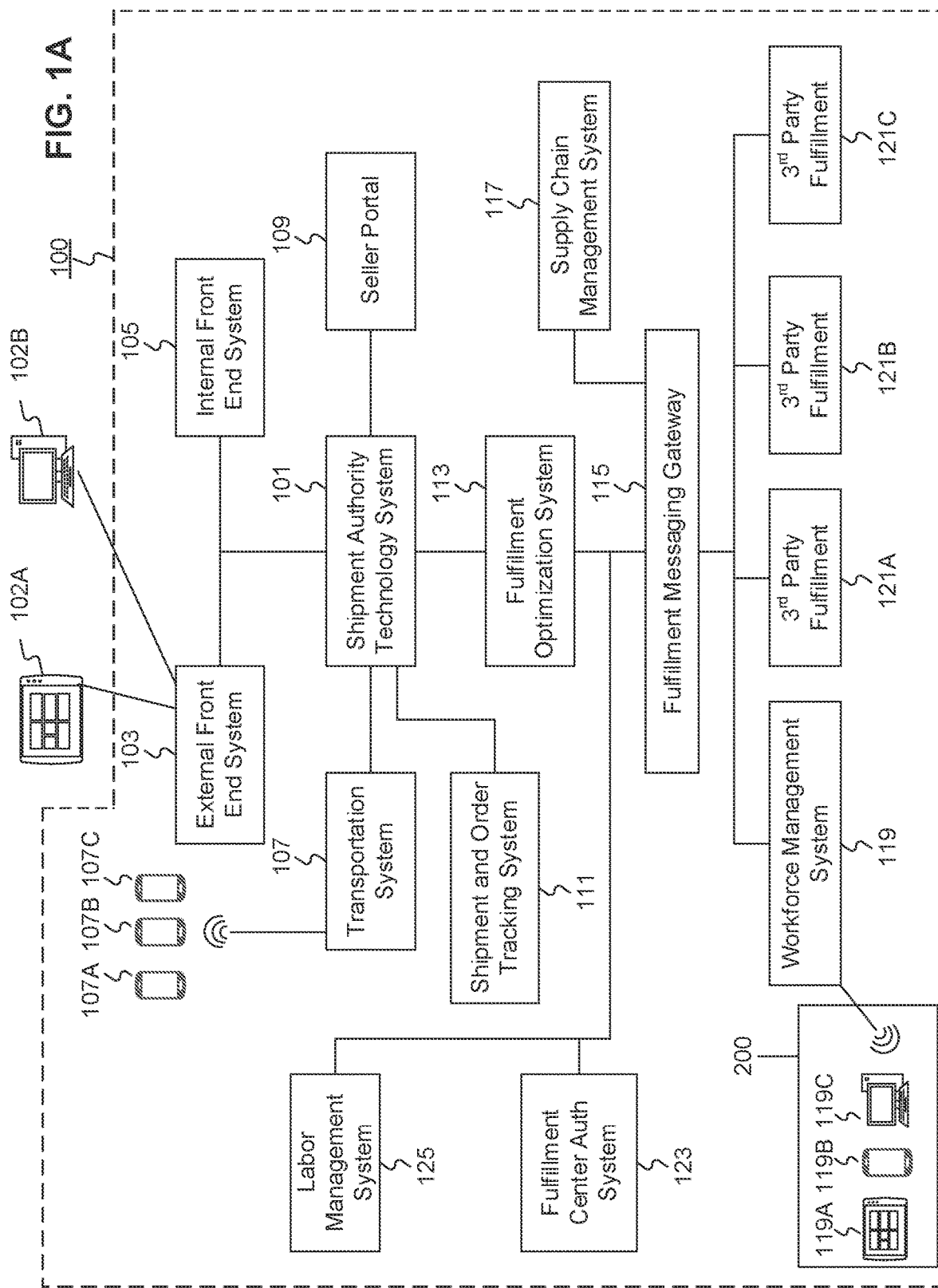
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for identifying a subset of electronic requests that can benefit from a more streamlined process, thus reducing load on the overall network and improving scalability. Compared to a traditional or an existing process, the streamlined process may be more advantageous in requiring less resources such as network load, computing power, and/or man-hour.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
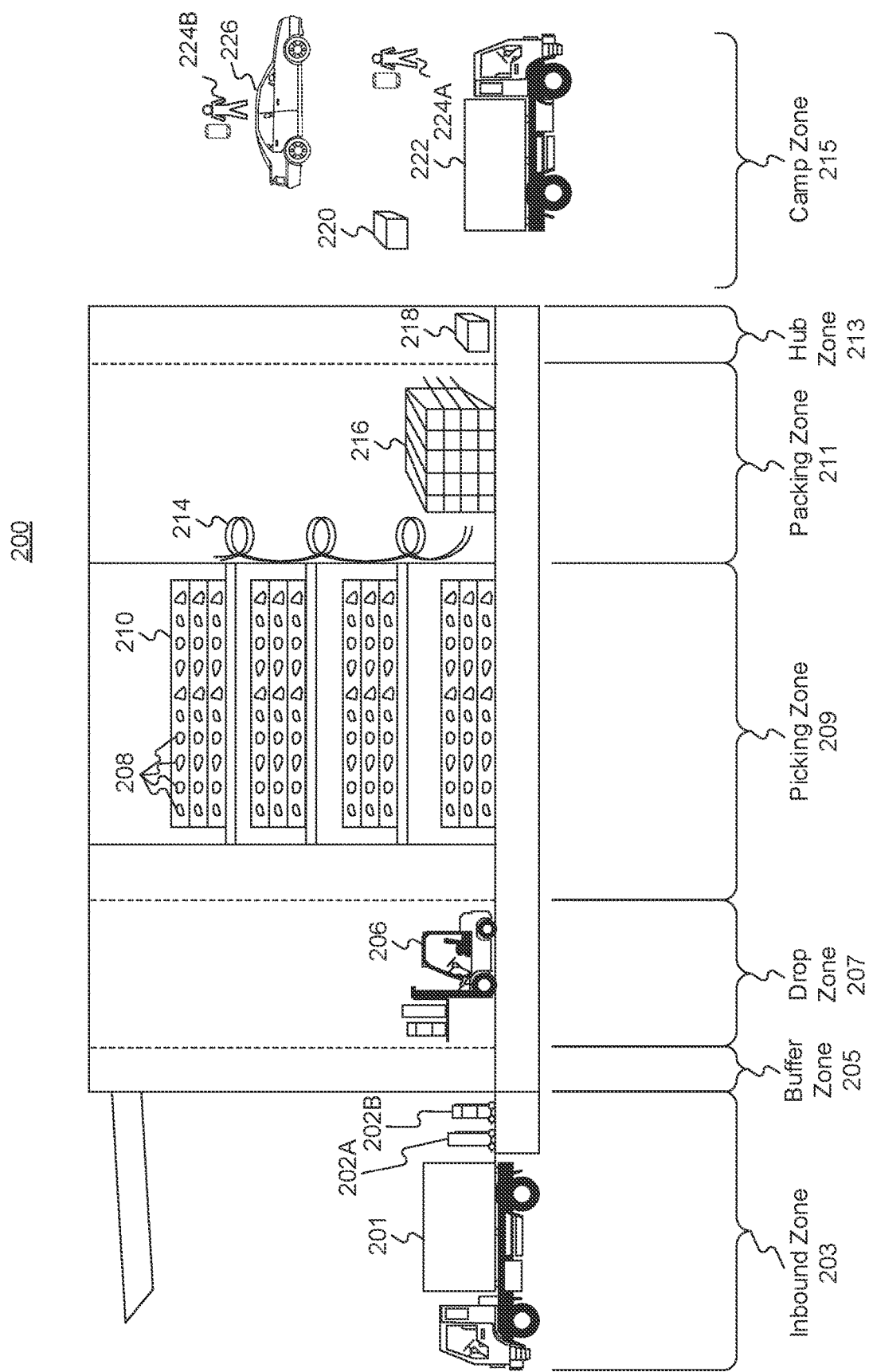
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3B:
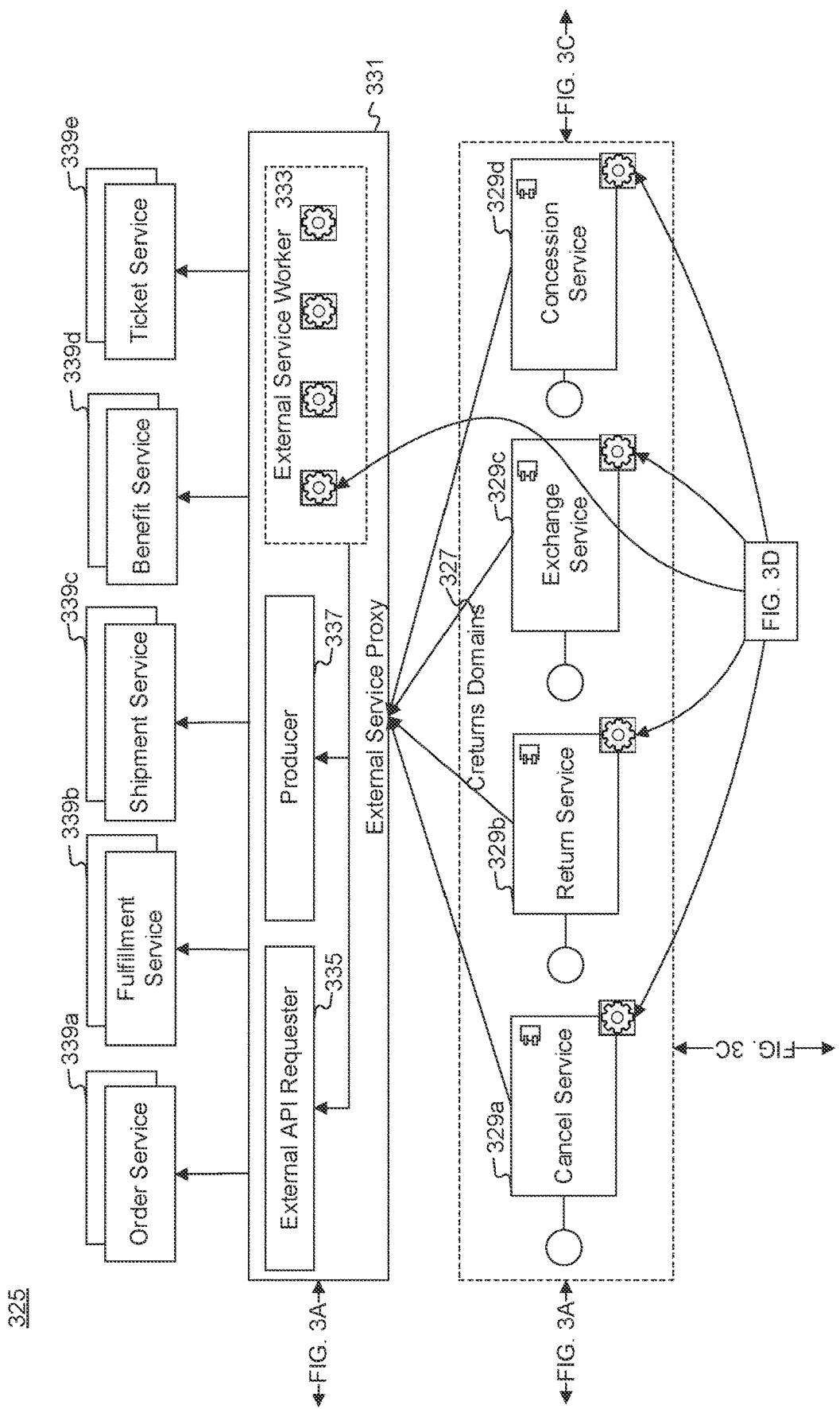
FIG. 3B illustrates an exemplary pictographic representation of an output sub-system 325, consistent with the disclosed embodiments.

FIG. 3A illustrates an exemplary pictographic representation of an intake sub-system 300. Intake sub-system 300 may be designated for initial processing of a communication from a source application program interface (API) 302. Source API 302 may be any one of a number of APIs, which may be specifically configured for use by a consumer, a delivery-person, an administrator, and/or a seller. Source API 302 may be implemented on a computing device having a processor, memory component, and/or communications component, such as a mobile device, a desktop computer, an adapter, a controller, a server, or any other device capable of sending and/or receiving API communications. In some embodiments, intake sub-system 300 and/or components of intake sub-system 300 may be communicably coupled to other sub-systems (e.g., as described in FIGS. 3B-3D).

Intake sub-system 300 may also include a number of endpoint APIs 304, to which source API 302 may be communicably coupled. In some embodiments, endpoint APIs 304 may only be a single endpoint API. Endpoint APIs 304 may include a plurality of controllers, adapters, and/or other computing devices, which may be managed by an API provider (not shown). For example, endpoint APIs 304 may be implemented by a combination of controllers, such as controller 306a, controller 306b, controller 306c, controller 306d, and/or controller 306e. In some embodiments, a controller may be designated for handling operations for a particular entity (e.g., a seller). A controller may be a hardware device or a software program, which may manage dataflows between different entities (e.g., between source API 302 and data aggregator 312). For example, a controller may be, without limitation, a flash controller, an application delivery controller, a primary domain controller, a baseboard management controller, and/or a session border controller. In some embodiments, a communication from source API 302 may be directed to a specific endpoint API or controller based on a source associated with the communication. For example, an API provider may receive a communication from a source API 302 and may determine (e.g., based on a message identifier, IP address, MAC address, communication format, and/or other unique identifier) a source and/or type of the communication. Based on the identified communication source and/or communication type, the API provider may direct the communication to a particular controller, which may be configured for communications of having a particular source and/or type. By way of further example, API provider may determine that a communication from source API 302 has a consumer device as its communication source and a return request as its communication type, and may direct the communication to an endpoint API 304 (e.g., controller 306b), which may be configured for handling communications having a source and/or type of the received communication (e.g., configured for return request communications).

Intake sub-system 300 may also include a validator 308, which may validate communications from a source API 302, and may be communicably coupled to endpoint APIs 304. Validator 308 may exist within an endpoint API 304 (e.g., as part of a controller), or may exist as a separate component, such as a server, to which an endpoint API 304 may be connected. Validator 308 may include various components (e.g., modules, devices, processors, etc.) configured to carry out a validation process (e.g., a process for validating communications received from a source API 302). For example, validator 308 may include a validator invoker, a validation pre-processor (e.g., for re-formatting data from a communication), a validator processor (e.g., for performing validation operations to data), a validator post-processor (e.g., for re-formatting validated data to a format understandable by another entity, such as rule engine 362 in FIG. 3C), a validation manager, and/or a message publisher (which may direct messages to another sub-system).

Intake sub-system 300 may also include an exception handler 310, to which validator 308 may be communicably coupled. Exception handler 310 may be part of validator 308, or may be a separate device or component, such as a server or mobile device. In some embodiments, validator 308 may direct a communication to exception handler 310 based on a validation result of a communication, which may have been determined by validator 308. For example, if a communication fails at least one rule or algorithm implemented by validator 308, validator may direct the communication to exception handler 310. In some embodiments, exception handler 310 may be configured re-format, split, parse, tag, and/or otherwise re-configure or transmit information from the communication (e.g., issuing an alert to an administrator device) based on the at least one rule or algorithm failed by the communication. Exception handler 310 may be communicably coupled to a data aggregator 312 and/or a logging & tracing module 314.

Intake sub-system 300 may also include a data aggregator 312, which may aggregate data from different sources, such as endpoint APIs 304, exception handler 310, and/or logging & tracing module 314. Data aggregator 312 may be communicably coupled to any device and/or component of sub-system 300, as well as devices and/or components of other systems including sub-systems 325 in FIG. 3B, 355 in FIG. 3C, and 375 in FIG. 3D. Data aggregator 312 may be part of a device having another purpose (e.g., validator 308), or may be a separate device or component, such as a server or mobile device. In some embodiments, data aggregator 312 may include various components (e.g., modules, devices, processors, etc.) configured to carry out a data aggregation process (e.g., a process for aggregating and/or analyzing data from sources such as a source API 302 and/or exception handler 310). For example, data aggregator 312 may include a data caching component, a data aggregator component, a data transformation component, a data mapping component, and/or a service router.

Intake sub-system 300 may also include a logging & tracing module 314, which may log and/or trace data associated with communications (e.g., communications from an API source 302). Logging & tracing module 314 may be part of a device having another purpose (e.g., data aggregator 312), or may be a separate device or component, such as a server or mobile device. In some embodiments, logging & tracing module 314 may include various components (e.g., modules, devices, processors, etc.) configured to carry out a data aggregation process (e.g., a process for tracing and/or logging data from sources such as a source API 302 and/or exception handler 310). For example, logging & tracing module 314 may include tracer 316 and/or trace analyzer 318.

Tracer 316 may perform functions to trace data, such as data associated with a communication from an API source 302, validator 308, etc. In some embodiments, tracer 316 may be configured to add trace identifiers and/or span identifiers to data associated with a communication. In some embodiments, tracer 316 may maintain definitions (e.g., user-defined, machine-defined, and/or a combination of user-defined and machine-defined) related to logging and tracing, such as definitions for where to transmit trace and/or log data, a threshold number of traces and/or logs to keep, data formats, particular combinations of identifiers to transmit, and/or particular libraries to trace. In some embodiments, tracer 316 may implement aspects of a function provider, such as Spring Cloud Sleuth.

Trace analyzer 318 may perform functions to analyze data, such as trace data and/or log data, which may be associated with communications from a device (e.g., a device implementing source API 302). For example, trace analyzer 318 may aggregate timing data (e.g., times when an exception occurred, exception frequency, etc.), a tag, rule failure data, rule satisfaction data, a device identifier, a message identifier, and/or any data associated with a source API 302. In some embodiments, trace analyzer 318 may generate visual representations of trace and/or log data (e.g., charts of filterable data, line diagrams, recommendations generated by statistical and/or machine learning algorithms, etc.). In some embodiments, trace analyzer 318 may implement aspects of a function provider, such as Zipkin.

FIG. 3B illustrates an exemplary pictographic representation of an output sub-system 325. Output sub-system 325 may be designated for processing output of the workflow sub-system 375 in FIG. 3D. Output sub-system 325 may pass processed output to external data sources 370 in FIG. 3C, pass processed output to be logged and/or traced with the logging & tracing module 314 in FIG. 3A and/or one or more of the external services 339*a-e*. Output sub-system 325 may be specifically configured for use by a consumer, a delivery-person, an administrator, and/or a seller. Output sub-system 325 may be implemented on a computing device having a processor, memory component, and/or communications component. In some embodiments, output sub-system 325 and/or components of output sub-system 325 may be communicably coupled to other sub-systems (e.g., as described in FIGS. 3A-3D).

Figure 3C:
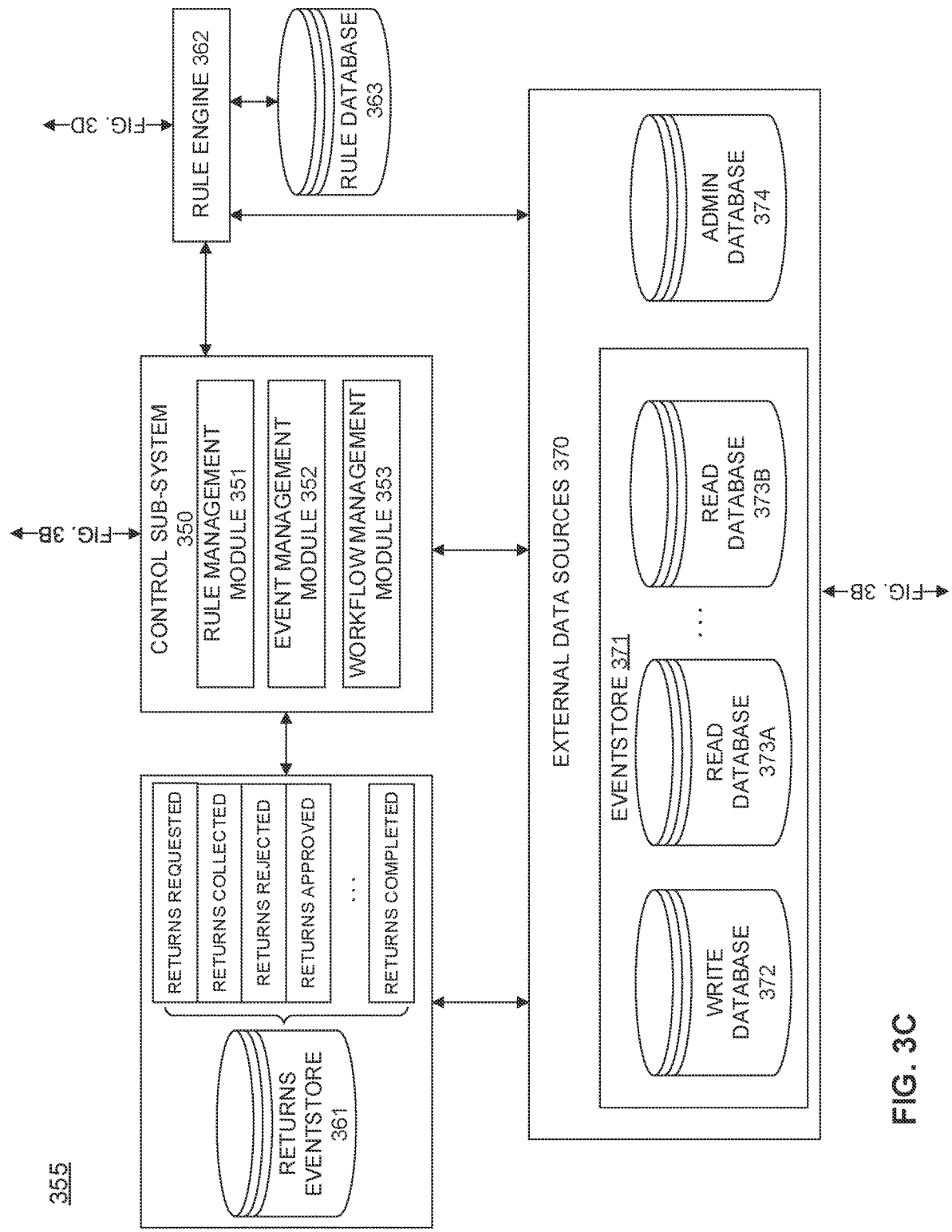
FIG. 3C illustrates an exemplary pictographic representation of a control sub-system, an exemplary returns event store, an exemplary rule engine, and exemplary external data sources, consistent with the disclosed embodiments.
Figure 3D:
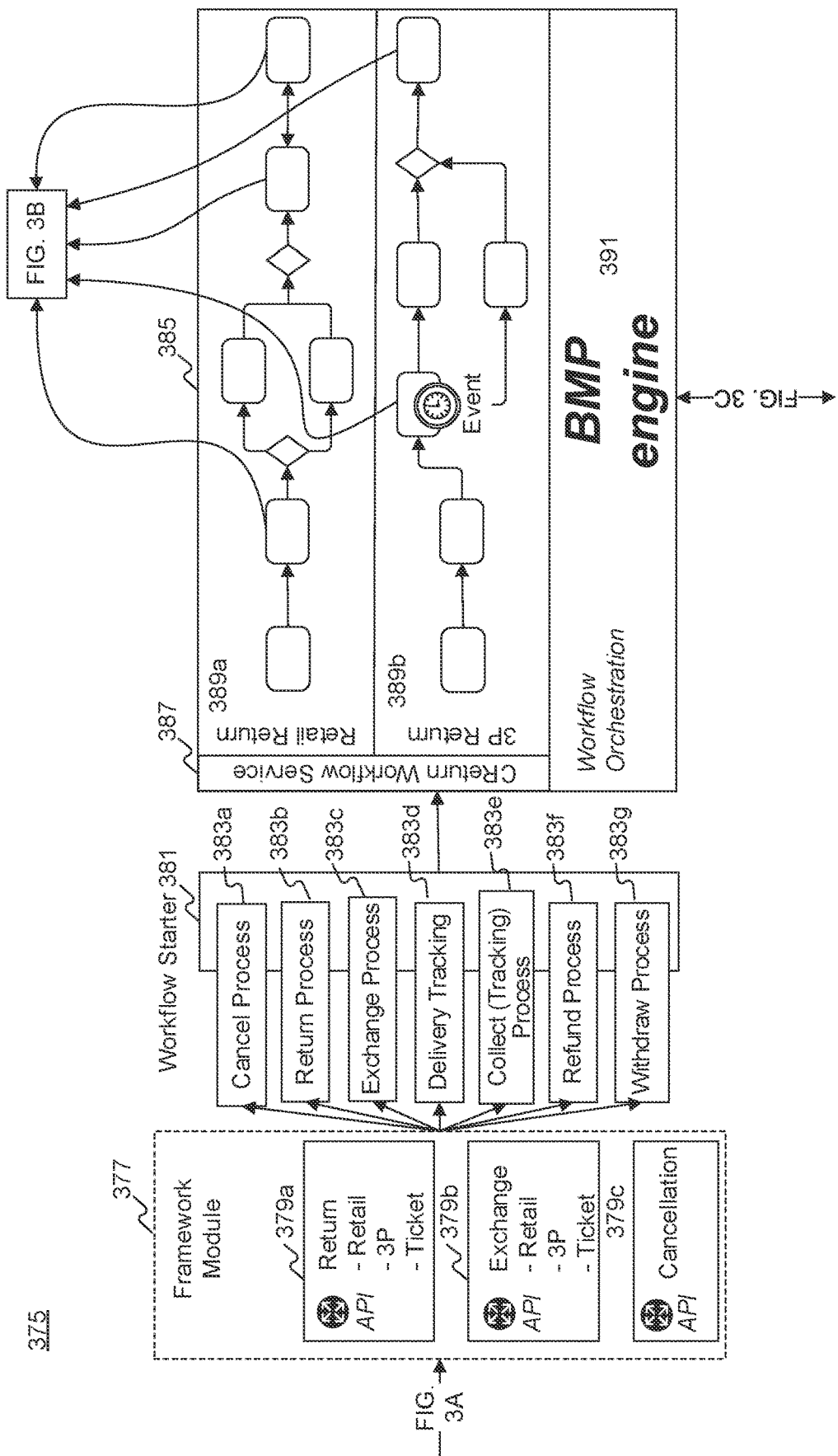
FIG. 3D illustrates an exemplary pictographic representation of a workflow sub-system 375, consistent with the disclosed embodiments.

Output sub-system 325 may include a number of Creturns Domains module 327, which may be communicably coupled to workflow sub-system 375 in FIG. 3D. In some embodiments, Creturns Domains module 327 may comprise a variety of services 329*a-d*. Examples of services as illustrated on FIG. 3B may include cancel service 329*a*, return service 329*b*, exchange service 329*c*, and/or concession service 329*d*. Each of the services 329*a-d* may be responsible for processing output from the respective workflow tasks in workflow sub-system 375 in FIG. 3D. For example, cancel process workflow 383*a* in FIG. 3D may pass an output to cancel service 329*a*, while return process workflow 383*b* in FIG. 3D may pass an output to return service 329*b*. Architecture of Creturns Domains module 327 be modified to add additional services as needed.

Creturns Domains module 327 may pass processed information to external data sources 370 in FIG. 3C, logging and tracing with logging & tracing module 314 in FIG. 3A and/or external service proxy module 331. Information passed to external data sources 370 is stored as described in section with reference to FIG. 3C. Information passed to logging & tracing module 314 is logged and processed as described earlier in section with reference to FIG. 3A.

External service proxy module 331, which is a part of output sub-system 325, may receive processed output from Creturns Domains module 327 for further direction to an appropriate external service 339*a-e*. Output sub-system 325 may use external service proxy module 331 to connect repeatedly to the same service without the expenditure of time and computing resources required for initializing a service proxy more than once. External service proxy module 331 may be implemented as a software or a hardware system between Creturns Domains module 327 and external services 339*a-e*. External service proxy module 331 may exist on the same machine as output sub-system 325 or on a separate server. External service proxy module 331 may be specifically configured for use by a consumer, an administrator, and/or a seller. External service proxy module 331 may be implemented on a computing device having a processor, memory component, and/or communications component.

External service proxy module 331 may also include an external service worker 333, which may receive data directly from the Creturn workflow starter 381 in FIG. 3D and may be communicably coupled to workflow sub-system 375 in FIG. 3D. External service worker 333 may exist within an external service proxy module 331, or may exist as a separate component, such as a server, to which an external service proxy module 331 may be connected. External service worker 333 may include various components (e.g., modules, devices, processors, etc.) configured to carry out output processing. For example, external service worker 333 may process data that is not processed by the Creturns Domains module 327.

External service proxy module 331 may also include an external API requester 335, to which external service worker 333 may be communicably coupled. External API requester 335 may be part of external service proxy module 331, or may be a separate device or component, such as a server or a virtual instance. In some embodiments, external service proxy module 331 may have a direct communication to external API requester 335 based on which of the external services 339*a-e* is required to pass the output to, which may have been determined by Creturns Domains module 327 or external service worker 333. For example, if external service required an API for communication, external API requester 335 may request appropriate API information to establish a connection with the required external service. In some embodiments, external API requester 335 may be configured to re-format, split, parse, tag, and/or otherwise re-configure or transmit information from the communication based on at least one rule or algorithm used by the external service.

External service proxy module 331 may also include a Producer 337, to which external service worker 333 may be communicably coupled. Producer 337 may be part of external service proxy module 331, or may be a separate device or component, such as a server or a virtual instance. Producer 337 is used to publish messages to topics. Topics may be divided into a number of partitions, which contain messages. Each message in a partition is assigned and identified by its unique offset. The message itself contains information about what topic and partition to publish to so data can be published to different topics with the same producer. In some embodiments, Producer 337 may be implemented using Kafka.

External service proxy module 331 may pass processed information to logging & tracing module 314 in FIG. 3A and/or external services 339*a-e*. Information passed to logging & tracing module 314 is logged and processed as described earlier in in section with reference to FIG. 3A.

External services 339a-e initiate actions based on the requests. Examples of services as illustrated on FIG. 3B may include order service 339a, fulfillment service 339b, shipment service 329c, benefit service 339d and/or ticket service 339e. Each of the services 329a-d may be responsible for initiation of specific actions. For example, in the event, workflow sub-system 375 in FIG. 3D passes an output for exchange service 329c processing, it may initiate a number of external services. Exchange of an item may involve an output to order service 339a to order (order instruction may include instruction to buy an item from a supplier, inform a picker to prepare the item, purchase the item online, go to a $3^{rd}$ party store and pick it up, or other instructions directed to acquiring an item) a new item, output to shipment service 339c to generate a return shipping label, and/or an output to fulfillment service 339b to process returned item. Architecture of output sub-system 325 may be modified to add additional external services as needed.

FIG. 3C illustrates a pictographic representation 355 of an exemplary control sub-system 350, an exemplary returns eventstore 361, an exemplary rule engine 362, and exemplary external data sources 370, consistent with disclosed embodiments.

Control sub-system 350 may be configured to create, update, maintain, and/or manage data used by various components of system 300 in FIG. 3A, 325 in FIG. 3B, and 375 in FIG. 3D. For example, control sub-system 350 may be configured to create, update, and/or modify parameters for managing returns by customers (e.g., rules for approving and rejecting a return by a customer), managing workflows for processing returns, and/or storing specific return events.

As illustrated in FIG. 3C, control sub-system 350 may include a rule management module 351, an event management module 352, and a workflow Management module 353.

Rule management module 351 may be configured to manage rules for processing returns by customers. For example, rule management module 351 may be configured to create and/or modify a rule for declining a return request by a customer. By way of example, rule management module 351 may be configured to create and/or modify a rule for declining a return request by a customer based on various parameters, including, for example, the data relating to the customer's previous return(s), the monetary amount involved in the return request, the type of the goods to be returned, etc. For example, rule management module 351 may create a rule for declining a return request by a customer if the customer returned an empty (or partially empty) box for a return within a predetermined number of days in the past (e.g., 180 days), which may indicate the customer may have attempted to defraud the system.

In some embodiments, rule management module 351 may be configured to create and/or modify a rule based on input by the user of control sub-system 350. For example, rule management module 351 may receive input from the user for modifying one or more parameters of a rule for validating return requests and modifying the parameter(s) of the rule accordingly.

Event management module 352 may be configured to create, modify, and/or manage events stored in returns eventstore 361. For example, event management module 352 may create a series of events for a return request initiated by a customer or the system and store the events into returns eventstore 361. By way of example, a customer may initiate a return of an order via a user device associated with the customer. Event management module 352 may create an event of receiving the return request and store the event in returns eventstore 361. In some embodiments, an event may include information relating to the return, the customer, and the order associated with the return. For example, event management module 352 may create a first event for a return requested by a customer, which may include the information of the return request, the time stamp of receiving the return request, the information relating to the customer, or the like, or a combination thereof. Event management module 352 may create a second event when one or more items subject to the return are received from the customer, which may include the information relating to the item(s) received (e.g., the quantity, condition, etc.), the time stamp of receiving the item(s), etc. Event management module 352 may also store the first and second event as a series of events relating to the return in returns eventstore 361.

In some embodiments, returns eventstore 361 may include, for example, Oracle™ databases, Sybase™ databases, or other relational databases or non-relational databases, such as Hadoop™ sequence files, HBase™, or Cassandra™. Returns eventstore 361 may include NoSQL databases such as HBase, MongoDB™ or Cassandra™. Alternatively, database 320 may include relational databases such as Oracle, MySQL and Microsoft SQL Server. In some embodiments, returns eventstore 361 may take the form of servers, general purpose computers, mainframe computers, or any combination of these components.

Workflow management module 353 may be configured to create, modify, and/or manage workflows used by various components of system 300 in FIG. 3A, 325 in FIG. 3B, and 375 in FIG. 3D. For example, workflow management module 353 may be configured to create, modify, and/or manage cancel process 383a, return process 383b, exchange process 383c, delivery tracking 383d, collect process 383e, refund process 383f, and withdraw process 383g used by workflow sub-system 375 (illustrated in FIG. 3D).

In some embodiments, control sub-system 350 may be configured to create, modify, and/or manage services used by Creturns Domains module 327 (illustrated in FIG. 3B). For example, control sub-system 350 may be configured to create, modify, and/or manage cancel service 329a, return service 329b, exchange service 329c, and/or concession service 329d. Creturns Domains module 327 may obtain one or more services from control sub-system 350.

Rule engine 362 may be configured to obtain rules for processing returns from control sub-system 350, and store and/or manage the rules for other components of the workflow sub-system 375 in FIG. 3D. For example, the workflow sub-system 375 in FIG. 3D may be configured to obtain the rules for validating return requests from rule engine 362. In some embodiments, rule engine 362 may include a rule database 363 for storing the rules for managing and/or processing returns.

External data sources 370 may be configured to store data for various components of system including subsystems 300 in FIG. 3A, 325 in FIG. 3B, and 375 in FIG. 3D. For example, external data sources 370 may store various services created and/or updated by control sub-system 350, including, for example, cancel service 329a, return service 329b, exchange service 329c, and/or concession service 329d. Creturns Domains module 327 may obtain one or more services from external data sources 370.

As another example, external data sources 370 may include an eventstore 371 configured to store data relating to events (e.g., return events). In some embodiments, eventstore 371 may include a write database 372 configured to write data in response to write commands. Eventstore may also include one or more read databases 373 (e.g., read database 373A, read database 373B, etc.) configured to read data only in response to query commands. In some embodiments, a read database 373 may include data that are the same as the data included in write database 372. For example, if the data stored in write database 372 are updated in response to a write command, the corresponding data in read database 373 may be updated accordingly such that write database 373 and read database 373 may include the same data. In some embodiments, external data sources 370 may include an admin database 374 configured to store administration data for control sub-system 350.

In some embodiments, eventstore 371 and/or admin database 374 may include, for example, Oracle™ databases, Sybase™ databases, or other relational databases or non-relational databases, such as Hadoop™ sequence files, HBase™, or Cassandra™. Eventstore 371 and/or admin database 374 may include NoSQL databases such as HBase, MongoDB™ or Cassandra™. Alternatively, database 320 may include relational databases such as Oracle, MySQL and Microsoft SQL Server. In some embodiments, eventstore 371 and/or admin database 374 may take the form of servers, general purpose computers, mainframe computers, or any combination of these components.

FIG. 3D illustrates an exemplary pictographic representation of a workflow sub-system 375. Workflow sub-system 375 may be designated for processing output of the intake sub-system 300. Workflow sub-system 375 may pass Validator 308 output to output sub-system 325. Workflow sub-system 375 may be specifically configured for use by a consumer, a delivery-person, an administrator, and/or a seller. Workflow sub-system 375 may be implemented on a computing device having a processor, memory component, and/or communications component. In some embodiments, workflow sub-system 375 and/or components of workflow sub-system 375 may be communicably coupled to other sub-systems (e.g., as described in FIGS. 3A-3D).

Workflow sub-system 375 may include a framework module 377. Framework module 377 may utilize Spring WebFlux or similar technology. Framework module 377 may provide for a non-blocking web stack to handle concurrency with a small number of threads and scale with fewer hardware resources. Framework module 377 may include a variety of programming modules. Examples of modules as illustrated in FIG. 3D may include return module 379a, exchange module 379b, and cancellation module 379c. Modules 379a-c may contain processing logic for retail, third party, and ticket offers. Modules 379a-c may also include an API for communication with sub-systems responsible for respective data.

Workflow sub-system 375 may also include a workflow starter 381, which may be communicatively coupled to framework module 377. Workflow starter 381 may include a list of processes 383a-g, which may initiate workflows based on the input received from the framework module 377. Examples of processes as illustrated in FIG. 3D may include cancel process 383a (containing instructions for starting a workflow initiated by the cancelation of an order by the consumer, supplier, or other order handler), return process 383b (containing instructions for starting a workflow initiated by the complete or partial order return by the consumer, supplier, or other order handler), exchange process 383c (containing instructions for starting a workflow initiated by an exchange of complete or partial order started by the consumer, supplier, or other order handler), delivery tracking 383d (containing instructions for starting a workflow initiated by the request to track delivery status of a complete or partial order by the consumer, supplier, or other order handler), collect process 383e (containing instructions for starting a workflow initiated by the request for tracking information of a complete or partial order by the consumer, supplier, or other order handler), refund process 383f (containing instructions for starting a workflow initiated by a request for refund for a complete or partial order started by the consumer, supplier, or other order handler), and withdraw process 383g (containing instructions for starting a workflow initiated by a withdrawal of complete or partial order started by the consumer, supplier, or other order handler).

Furthermore, each of the programing modules 379a-c of framework module 377 may initiate a plurality of processes 383a-g. For example, cancelation module 379c may initiate delivery tracking process 383d to determine if the item that is being canceled was deliver or is still in possession of the delivery personnel. Same cancelation module 379c may also initiate refund process 383f for issuing a refund to the customer.

Various combinations may be programed and may be specifically configured for use by a consumer, a delivery-person, an administrator, and/or a seller. Workflow starter 381 may be implemented on a computing device having a processor, memory component, and/or communications component. In some embodiments, workflow starter 381 and/or components of workflow starter 381 may be communicably coupled to other parts of workflow sub-system 375 (e.g., as described in FIG. 3D). Furthermore, architecture of workflow sub-system 375 be modified to add additional processes and programing modules as needed.

Workflow sub-system 375 may also include a workflow service module 385, which may be communicably coupled to workflow starter 381 and output sub-system 325. Workflow service module 385 may be designated for workflow control and design. Workflow service module 385 may include a Creturn workflow service module 387 and a workflow orchestration module 391. Workflow service module 385 may provide output for processing by output sub-system 325.

Creturn workflow service module 387 may include a number of sub-modules 389a-b which may control workflows based on the input received from the workflow starter 381. Examples of processes as illustrated in FIG. 3D may include retail return sub-module 389a, which allows for design and/or control of the workflows for the return of retail items and third party return sub-module 389b, which allows for design and/or control of the workflows for the return of third party items. Architecture of Creturn workflow service module 387 may be modified to add additional sub-modules as needed. Workflows within Creturn workflow service module 387 may be controlled, and/or designed by a consumer, a delivery-person, an administrator, and/or a seller. Creturn workflow service module 387 may be implemented on a computing device having a processor, memory component, and/or communications component and may be communicably coupled to other parts of workflow sub-system 375.

Workflow orchestration module 391 may include a set of workflow controls which may be accessed by a consumer, a delivery-person, an administrator, and/or a seller. Workflow orchestration module 391 may be implemented with a business process management (BPM) engine and supporting frameworks, one example of which may be Activiti with Spring Boot/Docker. A workflow orchestration module 391 engine has as core goal to take a process definition comprised of human tasks and service calls and execute those in a certain order, while exposing various API's to start, manage and query data about process instances for that definition. Workflow orchestration module 391 may be implemented on a computing device having a processor, memory component, and/or communications component. Workflow orchestration module 391 may be communicably coupled to other parts of workflow sub-system 375.

Figure 4:
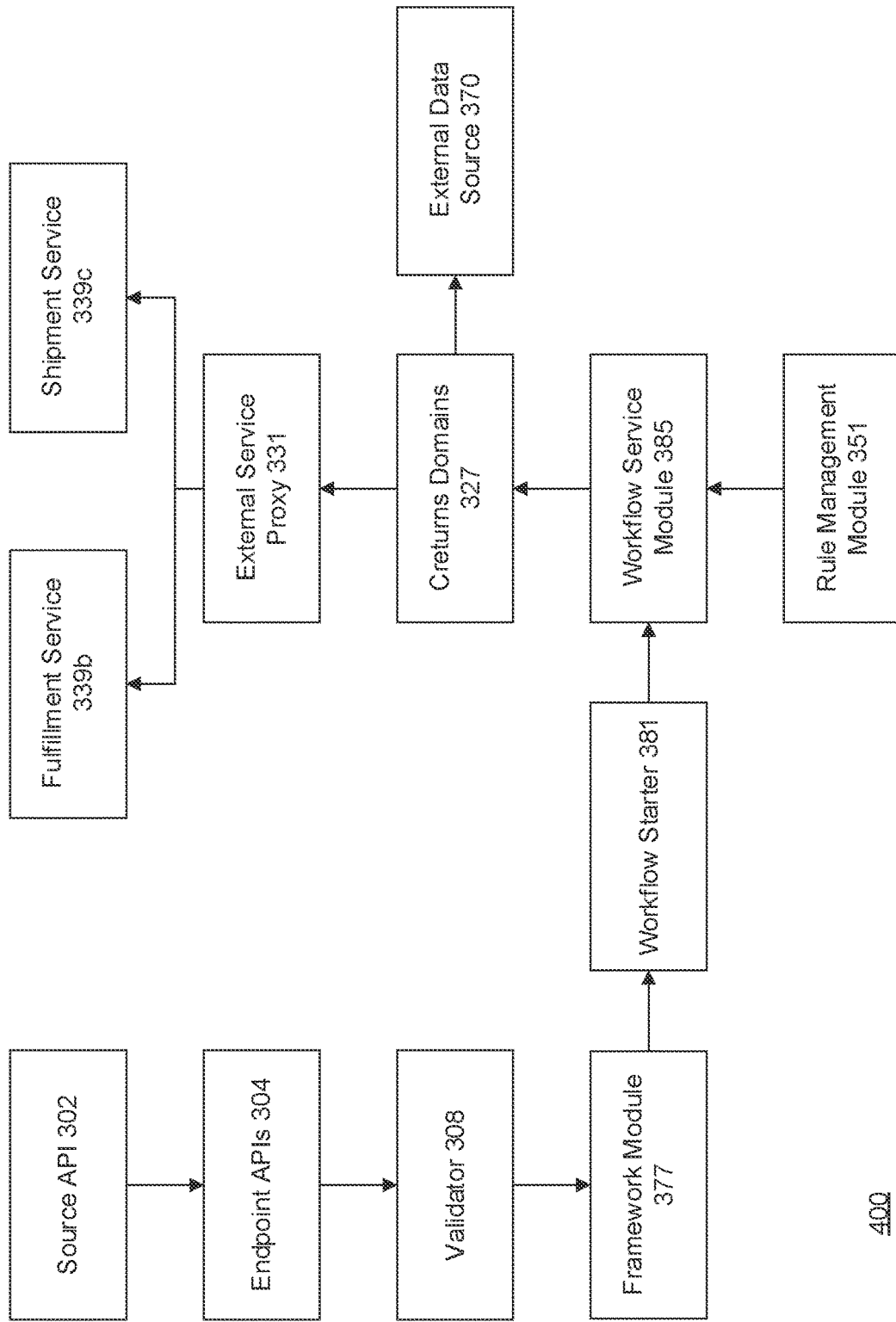
FIG. 4 illustrates an exemplary pictographic representation of a networked environment 400 for return processing that takes advantage of the currently disclosed embodiments.

FIG. 4 illustrates an exemplary pictographic representation of a networked environment 400 for return processing that takes advantage of the currently disclosed embodiments. While only a subset of the different systems, subsystems, and modules illustrated in FIGS. 3A-3D are illustrated in FIG. 4 for clarity and further explanation, other elements of FIGS. 3A-3D may be included in networked environment 400. Furthermore, the configurations and functionalities of the elements disclosed below may be combined with those of the corresponding elements in FIGS. 3A-3D in any In some embodiments, source API 302 may include any number of APIs that are configured to transmit electronic requests for a return. Each API in source API 302 may reside in a communication device such as a customer's mobile device 102A or an internal customer service system, which a worker may use to manually register a return request from a customer. Using these devices, for example, source API 302 may comprise a mobile application installed on a customer's mobile device transmitting an API call to endpoint APIs 304, a webpage accessed from a customer's computer transmitting a similar API call, an application operating from a customer service agent's computer manually entering a return request, or the like.

Endpoint APIs 304 may then receive the API calls from source API 302 and route them to appropriate systems, subsystems, and/or modules in networked environment 400. In some embodiments, endpoint APIs may use controllers 306*a-e* described above to further condition the received API calls and adopt the communication protocol of the network environment 400 (e.g., Java, HTML, CSS, or other programming languages).

One of the entities that receive the routed API calls, in some embodiments, may be validator 308. Validator 308 may be configured to check data included in the routed API calls in order to ensure, for example, that all required information is present and in compliance with respective data type and format.

In some embodiments, the validated API calls may be transferred to workflow service module 385 through, for example, framework module 377 and workflow starter 381. Workflow service module 385 may be configured to process the validated API calls based on different rules as initiated by the different processes (e.g., return process 383*b* or refund process 383*0* in workflow starter 381, taking various actions appropriate for each request represented by the API calls.

Consistent with the embodiments disclosed herein, some of the rules may be devoted to identifying the return request calls eligible for the streamlined process. The identification may be based on a consideration of the data included in each API call as a whole, where the values of different parameters in the API call are analyzed in combination with each other. For example, workflow service module 385 may analyze one or more of a customer-specified code, the type of the item to be returned, the price of the item to be returned, the customer's past return history, the seller's location, or other aspects of the item for return and the corresponding order.

In some embodiments, the rules used by workflow service module 385 may be stored in rule management module 351. As disclosed above with respect to FIG. 3C, rule management module 351 may be configured to manage the rules for processing the returns as requested in each return request call. Rule management module 351 may utilize rule engine technology via rule engine 362, which may provide the ability to centrally store the rules (or corresponding business logic) in rule database 363, such as return eligibility criteria or streamlined process eligibility criteria. This allows the rules to be easily changed, for example, to quickly meet new customer demands, regulatory changes, and/or competition in the marketplace.

Once a return request call is processed by workflow service module 385 (e.g., determined whether to approve or deny the return request, or determined whether the return request is eligible for the streamlined process), workflow service module 385 may generate and transmit a series of additional API calls to signal other systems, subsystems, or modules to take appropriate actions. For example, when workflow service module 385 determines that a return request call is approved, workflow service module 385 may generate a call to external service proxy 331 via Creturns Domains module 327 to activate fulfillment service 339*b* and/or shipment service 339*c*. The processes that the approved return request calls go through is described below with respect to FIG. 5.

Figure 5:
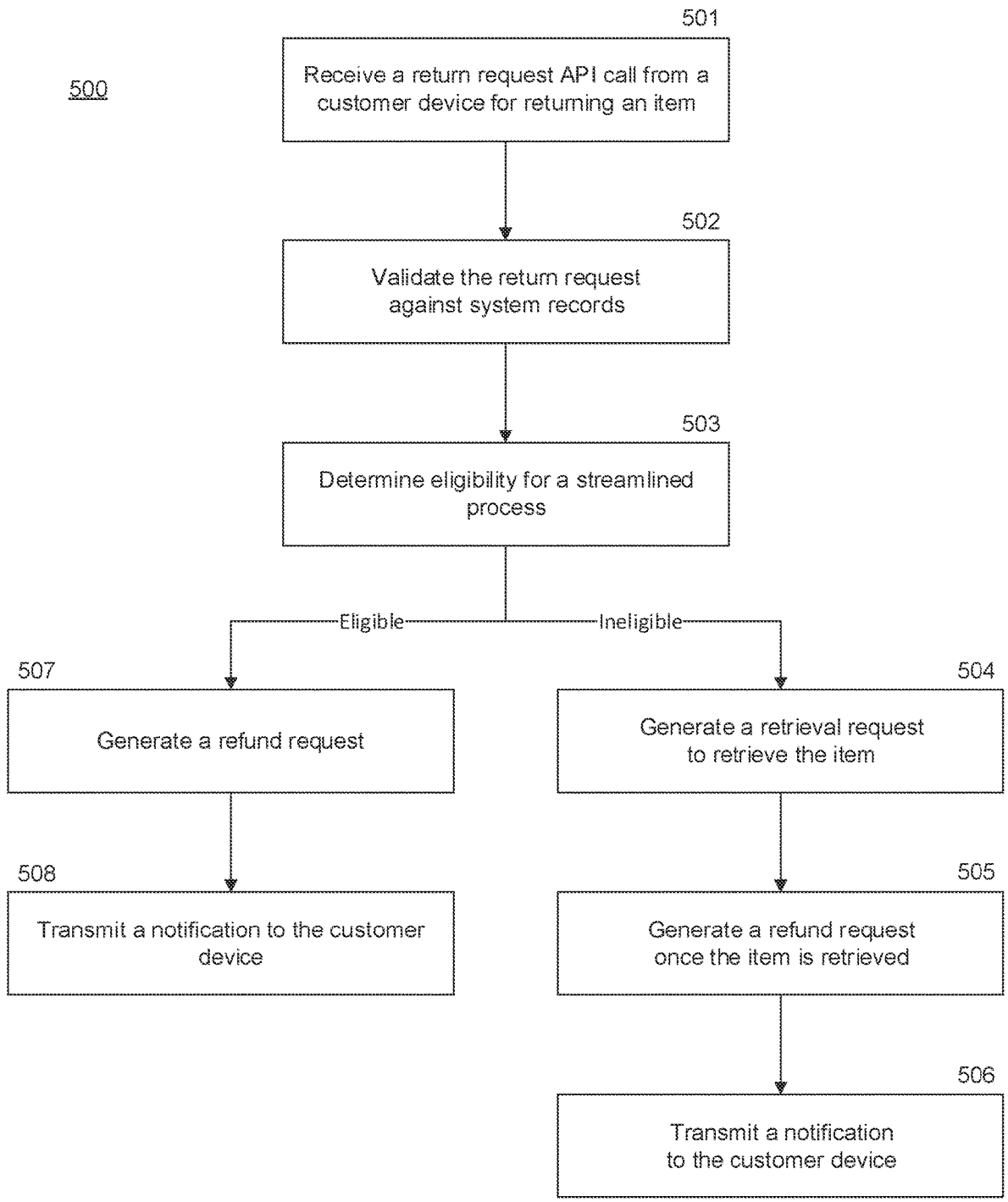
FIG. 5 illustrates an exemplary flowchart of a computerized process for processing a return, consistent with the disclosed embodiments.

FIG. 5 is a flowchart of an exemplary computerized process 500 for processing a return that takes advantage of the currently disclosed embodiments. While process 500 is described as applied to return processing, such use is only exemplary and process 500 can be modified to adapt other processes to reduce network load and improve scalability. Process 500 may be performed with any system, a network of systems, a server, or the like that is tasked with processing returns, such as the systems described above with respect to FIGS. 3A-3D and 4. Process 500 is described below with reference to the subsystems of FIGS. 3A-3D as well as networked environment 400 of FIG. 4, but any other configuration of systems, subsystems, or modules may be used to perform process 500.

Process 500 depicts two exemplary processes for reviewing and executing a return request-a regular process represented by steps 501-506 that improves the accuracy of managing the returns (e.g., receiving the request and receiving the returned item) and a streamlined process represented by steps 501-503, 507, and 508 that improves the speed of reviewing and executing the returns. In some embodiments, both processes of process 500 may be performed by the systems, subsystems, and modules depicted in FIGS. 3A-D, a subset of which are also depicted in FIG. 4. Variations of the two processes are also within the scope of the disclosed embodiments, and process 500 may include other processes for reviewing and executing a return request as well.

At step 501, the regular process may be initiated by receiving a return request from a customer device for returning one or more items. In some embodiments, the return request may be a return request call generated and transmitted by source API 302. As an example, the return request may be generated by a customer for returning one of the items of an order that he/she previously placed and received. In some embodiments, endpoint API 304 may route the return request calls to appropriate destinations as disclosed above.

In some embodiments, the customer may select an option to make a partial return, where only a portion of an item that was bundled with other items or was sold in a batch (e.g., a 3-pack cellphone screen protector) is to be returned. Such selections may be incorporated into a corresponding return request call by source API 302, where source API 302 may create a separate return request call for the partial return.

At step 502, validator 308 may validate the return request calls against system records. For example, validator 308 may extract basic information from the return request call such as the customer information, the item identifier of the item to be returned, and the order identifier of the original order associated with the item, and look up the information in FO system 113 to verify that the customer is indeed the person that ordered the item and that the item is indeed the item included in the order in the correct quantity. In some embodiments, validator 308 may also use the extracted information to determine whether the item is eligible for a return. Such rules may be a part of the rules stored in rule management module 351 described above.

In further embodiments where the return request call is for a partial refund, validator 308 may query FO system 113 to verify that the item can be returned in part. The verification may comprise comparing the item identifier of the item for partial return to a predetermined list of item identifiers eligible for a partial return or determining the item's eligibility based on a variety of factors. For example, the factors may include whether the corresponding vendor indicated that it will accept partial returns, whether the portion of the item can be sold separately, whether the portion can be repackaged or rebundled with other items, or other factors that may affect the marketability of the partially returned item.

At step 503, workflow service module 385 may analyze the return request calls to determine their eligibility for the streamlined process. Step 503 is described below in more detail with respect to the streamlined process. In some embodiments where process 500 only comprises either the regular process or the streamlined process, step 503 may be omitted or replaced to perform another function. In further embodiments, step 503 may also include determining whether to approve the return request using various modules such as Creturn workflow service module 387, retail return sub-module 389*a*, third party return sub-module 389*b*, and workflow orchestration module 391 described above.

At step 504, workflow service module 385 may generate and transmit a series of API calls to other systems, subsystems, or modules such as Creturns domains 327, external service proxy 331, fulfillment service 339*b*, and shipment service 339*c* as described above. In some embodiments, workflow service module 385 may generate one or more API calls to request retrieval of the item to be returned, which may comprise, for example, generating a return shipping label or dispatching a courier to pick up the item from the customer. Additionally or alternatively, the one or more API calls may also cause an autonomous system such as an autonomous robot, vehicle, or drone to travel to the customer's address specified in the corresponding return request call and retrieve the item.

In further embodiments, step 504 may also include receiving and restocking the returned item at a fulfillment center, which may also be performed using an autonomous robot, vehicle, or the like. For example, step 504 may comprise capturing (e.g., using a camera, scanner, RFID sensor, etc.) an item identifier of the returned item upon arrival at the fulfillment center and updating the data records of external data source 370 to record the retrieval or the arrival of the item.

As described above with respect to FIG. 3B, retrieving and restocking the item may involve a complex network of modules that each communicate using API calls. For example, return service 329*b* may receive an output from workflow service module 385 that triggers a series of subsequent calls to downstream modules (e.g., elements in external service proxy 331 or services 339*a-e*), each of which is associated with physical movement of items from the customer's address to various locations within a fulfillment center (e.g., FC 200) as the items are retrieved and restocked.

At step 505, once the returned item is received at a fulfillment center (e.g., FC 200), output sub-system 325 may generate yet another set of API calls to request a refund for the price of the returned item. In some embodiments, workflow service module 385 may generate and transmit the set of API calls for refund to payment management systems (not depicted) for communication with financial institutions and an eventual release of payments. The API calls for refund may also prompt external data source 370 to update data records pertaining to the customer that requested the return.

Still further, at step 506, output sub-system 325 may generate and transmit a notification (e.g., text message, in-app push notification, email, etc.) to the customer device associated with the customer that requested the return. Such notification may be transmitted in response to a completion of the API calls for refund. In some embodiments, the customer device may be the device that initially transmitted the return request call at step 501 above. Additionally or alternatively, the customer device may be a different device authenticated using the customer's login credentials.

While the exchange of the API calls among a network of different systems, sub-systems, and modules may appear complex, such exchange may allow different functional units (i.e., sub-systems or modules) to specialize in specific tasks. This may improve efficiency and reduce the error rate compared to traditional processes of managing returns. In some embodiments, such compartmentalized handling of different tasks may enable a modular implementation of each sub-system or modules, which may also improve flexibility when any of the sub-systems or modules fail, allowing other parts of the network to function on their own.

On the other hand, the streamlined process may improve the speed of managing the returns by omitting a portion of the steps performed in the regular process such as retrieving and restocking the item for return. While the regular process may improve the efficiency and accuracy of managing the returns, each of the API calls exchanged between different sub-systems and modules in response to each return request call as described above exerts a load on the network of the systems, sub-systems, and modules. The load, however small they may be, can quickly amass to throttle or overwhelm the network as the number of return request calls increase.

For example, more than 10 API calls per return request may be made to shipment service 339*c* over the course of a day as the systems process and keep track of the return request calls. Each of the more than 10 API calls may also trigger a series of subsequent calls within other networked systems described above with respect to FIG. 1A (e.g., SAT system 101), thereby adding to the network load. All in all, step 504 may take up a majority of resources spent on processing a return through process 500.

The streamlined process eliminates the need for these API calls for a subset of the return request calls, thereby reducing the network load. While the savings realized by the streamlined process may be negligible with respect to individual return request calls, the savings realized among hundreds of thousands or millions of users and their requests may accumulate to a significant advantage that improves scalability of the network. In other words, the network resource reduction resulting from processing return request calls through the streamlined process may ensure low latency and optimal network utilization even as the number of users and their requests increase exponentially. These savings, in turn, may contribute to lower operating cost in terms of maintaining and operating the network.

Still further, the streamlined process may also reduce operating cost in terms of actual man-hours and physical resources necessary for the regular process. For example, in a case where step 504 involves retrieving the returned item from the customer, a worker must be dispatched to the customer's address, obtain the returned item, and return. Multiple trips may also be necessary if the customer is not present and the worker must be dispatched again. In another example, there is also the cost of inspecting and restocking the returned item, which may further complicate the regular process if the returned item is damaged or must be disposed in accordance with environmental regulations. The streamlined process thus leads to both technical and business advantages over the regular process for the subset of return requests that are eligible.

Enabling partial returns may contribute further to such technical and business advantages by breaking up large returns into smaller return. For example, conventional return processes may only allow whole returns, where each item must be returned in whole regardless of whether the item comprises a group of smaller items. Forcing customers to return the whole item even when only a portion of the whole item needs to be returned may prevent networked environment 400 from taking full advantage of the streamlined process, since the portion of the whole item may have been eligible for the streamlined process. Breaking up the minimum size of return requests so that a portion of an item can be returned instead of the entire item may allow more return request calls to meet the eligibility criteria of streamlined processes, thus increasing the reductions in network resources and operating costs.

Turning to the streamlined process represented by steps 501-503, 507, and 508, the process may share steps 501-503 with the regular process. In these embodiments, all return request calls may go through steps 501 and 502 before they are split into either the regular process described above or the streamlined process below.

At step 503, workflow service module 385 may analyze the return request call to determine eligibility for the streamlined process. The determination may be based on a set of rules stored in rule management module 351. In some embodiments, the rules may correspond to one or more different scenarios in which the return request calls fall. Exemplary scenarios are described below, and other scenarios or variations thereof are within the scope of the disclosed embodiments as well.

As an initial matter, some of the return request calls may have been received before the corresponding orders were shipped to the customer. As such, workflow service module 385 may be configured to confirm whether the corresponding order has been shipped. Workflow service module 385 may accomplish this by generating an API call with the corresponding order identifier to FO system 113 and receiving the status of the order. Workflow service module 385 may then cancel the order, in its entirety or in part, and generate a refund request as discussed above if the order has not shipped yet, or otherwise proceed to determining whether the return request call is eligible for the streamlined process. Any portion of the order that is not cancelled may proceed to the next steps of the order fulfillment process described above.

In some embodiments, one or more of the rules may determine the eligibility based on a customer-specified code for indicating a reason for requesting the return. The customer-specified code may be specified, for example, by a customer submitting a return request through a mobile application or a website and be contained in the corresponding return request call as a parameter. The customer-specified codes may include any set of predetermined alphanumeric string of text associated with different scenarios. Possible scenarios may comprise, for example, change of mind, incorrect item, damaged in transit, inconsistent with the item description, missing item, or the like.

In some embodiments, return request calls containing a customer-specified code associated with a missing item may be set to be eligible for the streamlined process, because the customer is physically unable to return the item if the item had been missing in the first place (e.g., lost or undelivered). In some embodiments, workflow service module 385 may also compare the item identifier corresponding to the item to be returned to a list of items eligible for the streamlined process. Alternatively or additionally, other codes associated with different scenarios may also be set to be eligible for the streamlined process as determined by the desired business practice.

Still further, workflow service module 385 may look up a record associated with the customer that requested the return in order to verify whether the customer could have selected the reason code for the missing item with a fraudulent intent. Such determination may be performed by a fraud detection system (not depicted) that keeps a detailed log of each customer's purchase and return activity. The fraud detection system may then analyze the log with a machine learning algorithm to identify suspicious requests. For example, the log may track the kind of items that a customer bought, their price, the subset of the items that were returned, the returned items' price and condition, or any other information directly or indirectly contained in the customer's return requests. Additionally or alternatively, workflow service module 385 may still set return request calls containing customer-specified codes associated with a missing item to be ineligible if the purchase price of the items is greater than a predetermined threshold. This may allow workflow service module 385 to review the return request call more thoroughly as they go through the regular process and identify any fraudulent requests.

Returning to step 503, another set of rules may determine the eligibility based on information contained in the return request call indicating that the customer has already shipped the item to the fulfillment center. The information may comprise, for example, one of the customer-specified code described above and/or a tracking number for the return shipping. In such cases, workflow service module 385 may determine that there is no need to generate a retrieval request as described above with respect to step 504 and determine that the corresponding return request call is eligible for the streamlined process. Workflow service module 385 may also generate and transmit an API call to update a record associated with the particular item to be returned by the customer to contain the information on the customer's own return shipping. In some embodiments, workflow service module 385 may proceed to generate a refund request and transmitting a notification to the customer device in the manner described above with respect to steps 507 and 508.

In further embodiments, yet another set of rules may determine the eligibility for the streamlined process based on the type of the item for return. The eligible types may include, for example, perishable items that will not arrive at the fulfillment center in resaleable conditions or those purchased from a foreign vendor, which may incur a relatively high return shipping cost. In some embodiments, workflow service module 385 may determine the item type by sending an electronic query to a connected database (e.g., external data sources 370) with an item identifier contained in the return request call and receiving a parameter for the item type.

The connected database may be configured to keep a list of item identifiers with recommended storage temperatures and respond to the electronic query with an eligibility determination based on the corresponding storage temperatures. For example, items with recommended storage temperatures below freezing may be considered ineligible because they are likely to perish during transit. In further embodiments, the list of item identifiers in the connected database may specify whether some of the items were sold by foreign vendors. The cost of retrieving the corresponding items and shipping them back to the foreign vendors may be so large that it is better not to retrieve the items in some cases. As such, the connected database may determine that these items should be eligible for the streamlined process (thus refunding the purchase price without retrieving the item) if their purchase price is lower than a predetermined threshold.

Once workflow service module 385 determines that the type of the item for return matches one of the predetermined set of item types, workflow service module 385 may further determine that the corresponding return request call is eligible for the streamlined process. In some embodiments, this may be because the returned item will probably not be resaleable or profitable and there is no need to generate a retrieval request as described above with respect to step 504. In some embodiments, workflow service module 385 may proceed again to generating a refund request and transmitting a notification to the customer device in the manner described above with respect to steps 507 and 508.

In some embodiments, the records of the customers that requested the returns eligible for the streamlined may be updated to reflect that the customer qualified for a refund without returning the item. Such records may be used later by a fraud detection system (not depicted) to analyze and identify fraudulent return request calls that appear to be eligible for another refund without a return.

At step 507, once workflow service module 385 determines that the return request call is eligible for the streamlined process, workflow service module 385 may proceed to requesting a refund as described above with respect to step 505. In contrast to step 505 where the refund request is in response to receiving the returned item, however, workflow service module 385 may generate the API calls for the refund request upon determination that the corresponding return request call is eligible for the streamlined process.

Alternatively or additionally, workflow service module 385 may perform an additional check to identify fraudulent return requests before issuing refunds. Workflow service module 385 may transmit an API call to the fraud detection system with information on the corresponding return request call and the customer, in response to which the fraud detection system may return a determination as to whether the return request call could be fraudulent. A positive determination may cause workflow service module 385 to deny the refund request and treat the return request call under the regular process, beginning from step 504. In some embodiments, workflow service module 385 may also notify shipment service 339c to specify that no item will be returned and, and step 508, transmit a notification to the customer device as described above with respect to step 506.

Figure 6:
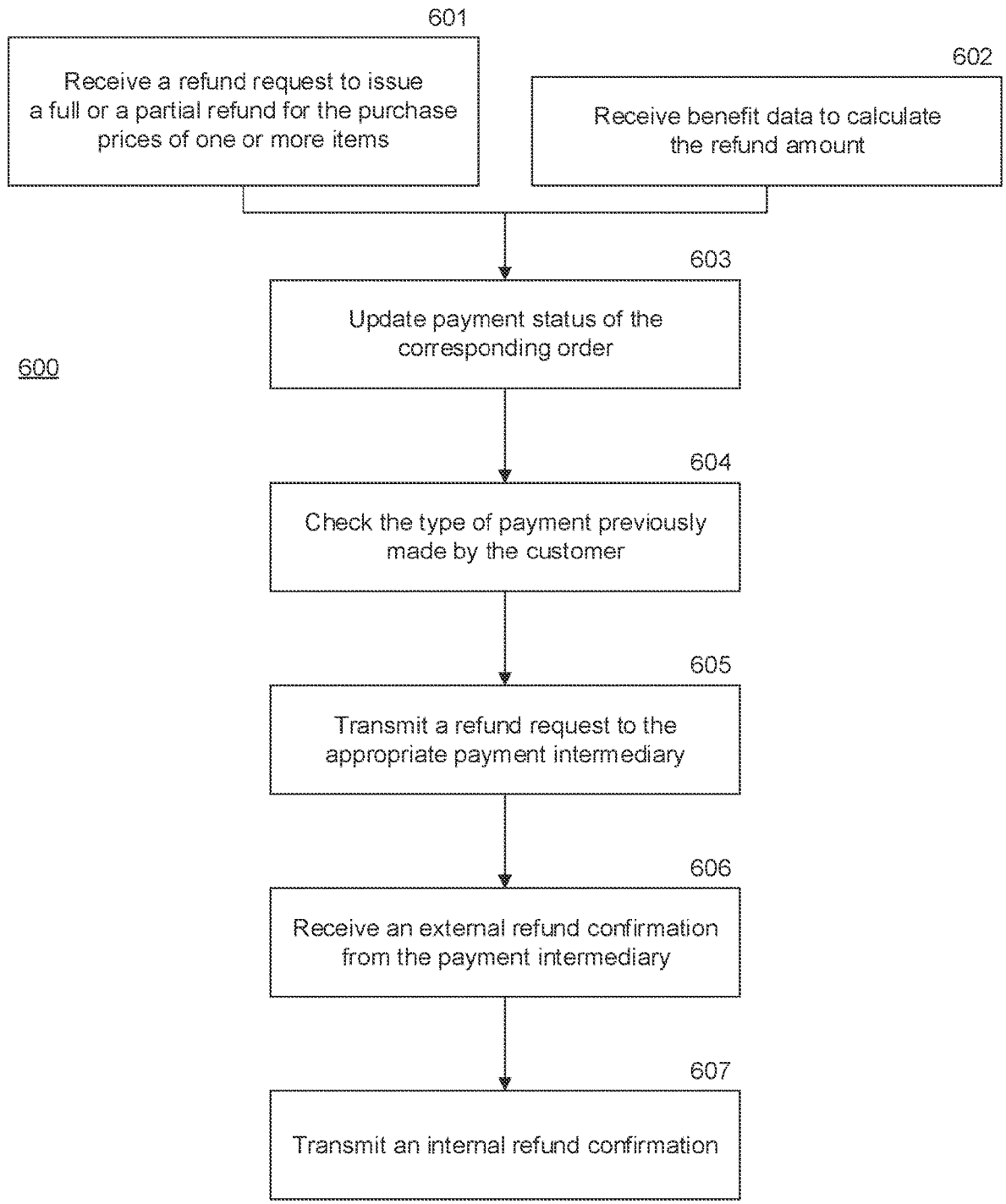
FIG. 6 illustrates an exemplary flowchart of a computerized process for processing a refund, consistent with the disclosed embodiments.

FIG. 6 illustrates an exemplary flowchart of a computerized process 600 for processing a refund. Process 600 may be performed in connection with any refund request generated by the systems described above, including but not limited to the refund requests generated at step 505 of the regular process and at step 507 of the streamlined process. Process 600 may be performed with any system, a network of systems, a server, or the like that is tasked with processing refunds, such as the systems described above with respect to FIGS. 3A-3D and 4. Process 600 is described below with reference to the subsystems of FIGS. 3A-3D as well as networked environment 400 of FIG. 4, but any other configuration of systems, subsystems, or modules may be used to perform process 600.

At step 601, workflow starter 381 may begin the refund process by receiving a refund request to refund purchase prices of one or more items. The refund request may be in the form of an API call generated and transmitted by workflow service module 385. In some embodiments, step 601 may further comprise adding the refund request to a refund request queue via refund process 383f. The refund request may include one or more parameters specifying whether the refund is a full refund of the purchase prices or a portion thereof.

At step 602, workflow service module 385 may send a request to benefit service 339d with information for identifying the order and receive benefit data to calculate the right refund amount. The benefit data may include information on discounts and promotions that the corresponding customer received at the time of the purchase. The discounts and promotions may have been offered by a variety of entities such as the vendor, the online retailer, the online marketplace platform, the payment processor, the bank, or the like. In some embodiments, workflow service module 385 may transmit these data to payment processing module (not depicted) through order service 339a.

In some embodiments where the refund request is for a partial refund, workflow service module 385 may use the information from the refund request to calculate a refund amount proportionate to the quantity of the items for refund relative to the total quantity of the items purchased by the customer. In further embodiments, certain items, as may be recorded in the corresponding order information or the benefit data, may have been sold under a promotion that requires a minimum number of the items to be purchased. Workflow service module 385 may increase or decrease the refund amount for such items based at least on whether the number of remaining items is below the minimum number. Additionally or alternatively, workflow service module 385 may adjust the refund amount by a multiplier to reflect a penalty or a fee, where the return had been due to the customer's fault (e.g., ordered too many, change of mind, etc.)

At step 603, the payment processing module may update the payment status and order status of the corresponding order, which may comprise updating the corresponding records in one or more network databases to reflect the total payment amount after the refund and the items that have been returned.

At step 604, the payment processing module may check the type of payment previous made by the customer by retrieving the corresponding information while updating the order status. In some embodiments, the payment processing module may use the benefit data and the associated order information to identify the entities that must be contacted in order to cancel a previous transaction (e.g., for reverting cashback or membership rewards transactions) and determine the amount that must be refunded to the customer.

At step 605, the payment processing module may transmit a set of API calls containing individual refund requests to the appropriate payment intermediaries. The payment intermediaries here may include the entities identified above at step 604 as well as the payment processor for the payment method used by the customer.

At step 606, the payment processing module may receive external refund confirmations from each of the payment intermediaries, confirming that the individual refund requests have been completed and refund issued (or will be issued after further processing).

At step 607, the payment processing module may transmit an internal refund confirmation back to workflow service module 385 once an external refund confirmation is received from every payment intermediary. In some embodiments, the internal refund confirmation may indicate to the workflow service module 385 that the refund has been issued and that it can proceed to transmitting a notification to the customer device as described above at steps 506 and 508.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for processing a partial refund without receiving an item to minimize network load, the system comprising:
   at least one non-transitory computer-readable medium storing instructions; and
   at least one processor executing the instructions to perform operations comprising:
      receiving a return application programming interface (API) call from a user device requesting a return of a plurality of individual items;
      analyzing the return API call to determine whether a subset of the individual items is defective;
      determining whether the return API call for the subset of the individual items is eligible for a first return process by determining at least one of:
         whether a corresponding vendor indicated that it will accept partial returns, whether the portion of the item can be sold separately, or whether the portion can be repackaged or re-bundled with other items; and
      when the return API call for the subset of the individual items is eligible for the first return process:
         generating a refund API call to issue an amount for the price of the subset of the individual items as a refund; and
         transmitting a notification to the user device regarding an approval of the return API call,
      when the return API call for the subset of the individual items is ineligible for the first return process, generating a retrieval API call to initiate a second return process.

2. The computer-implemented system of claim 1, wherein the operations further comprise: validating the return API call based on one or more system rules stored in a centralized repository.

3. The computer-implemented system of claim 1, wherein determining whether the subset of the individual items is defective comprises determining that the return API call is for a partial refund.

4. The computer-implemented system of claim 1, wherein determining whether the return API call for the subset of the individual items is eligible for a first return process further comprises:
   querying a connected system to confirm whether the subset of the individual items has shipped.

5. The computer-implemented system of claim 1, wherein determining whether the return API call for the subset of the individual items is eligible for a first return process further comprises:
   analyzing a user-specified code for predetermined eligible scenarios.

6. The computer-implemented system of claim 1, wherein the first return process is quicker than the second return process by omitting one or more sub-processes included in the second return process.

7. The computer-implemented system of claim 1, wherein the first return process exerts less network load than the second return process by requiring less communication between connected systems.

8. The computer-implemented system of claim 1, wherein the first return process reduces operating cost compared to the second return process by eliminating a need to retrieve the subset of the individual items.

9. The computer-implemented system of claim 1, wherein the operations further comprise: determining the amount for the price of the subset of the individual items by determining an amount proportionate to a ratio of the subset of the individual items to the individual items multiplied by a multiplier.

10. A computer-implemented method for processing a partial refund without receiving an item to minimize network load, the method comprising:

receiving a return application programming interface (API) call from a user device requesting a return of a plurality of individual items;

analyzing the return API call to determine whether a subset of the individual items is defective;

determining whether the return API call for the subset of the individual items is eligible for a first return process by determining at least one of:

whether a corresponding vendor indicated that it will accept partial returns, whether the portion of the item can be sold separately, or whether the portion can be repackaged or re-bundled with other items; and when the return API call for the subset of the individual items is eligible for the first return process:

generating a refund API call to issue an amount for the price of the subset of the individual items as a refund; and transmitting a notification to the user device regarding an approval of the return API call, when the return API call for the subset of the individual items is ineligible for the first return process, generating a retrieval API call to initiate a second return process.

11. The computer-implemented method of claim 10, further comprising:

validating the return API call based on one or more system rules stored in a centralized repository.

12. The computer-implemented method of claim 10, wherein determining whether the subset of the individual items is defective comprises determining that the return API call is for a partial refund.

13. The computer-implemented method of claim 10, wherein determining whether the return API call for the subset of the individual items is eligible for a first return process further comprises:

querying a connected system to confirm whether the subset of the individual items has shipped.

14. The computer-implemented method of claim 10, wherein determining whether the return API call for the subset of the individual items is eligible for a first return process further comprises:

analyzing a user-specified code for predetermined eligible scenarios.

15. The computer-implemented method of claim 10, wherein the first return process is quicker than the second return process by omitting one or more sub-processes included in the second return process.

16. The computer-implemented method of claim 10, wherein the first return process exerts less network load than the second return process by requiring less communication between connected systems.

17. The computer-implemented method of claim 10, wherein the first return process reduces operating cost compared to the second return process by eliminating a need to retrieve the subset of the individual items.

18. The computer-implemented method of claim 10, further comprising:

determining the amount for the price of the subset of the individual items by determining an amount proportionate to a ratio of the subset of the individual items to the individual items multiplied by a multiplier.

* * * * *